United States Patent [19]

Lailach et al.

[11] Patent Number: 5,122,358
[45] Date of Patent: Jun. 16, 1992

[54] PROCESS FOR THE PURIFICATION OF EXHAUST GASES

[75] Inventors: Günter Lailach; Rudolf Gerken, both of Krefeld, Fed. Rep. of Germany

[73] Assignee: Bayer Aktiengesellschaft, Leverkusen, Fed. Rep. of Germany

[21] Appl. No.: 275,297

[22] Filed: Nov. 23, 1988

Related U.S. Application Data

[63] Continuation of Ser. No. 89,898, Aug. 27, 1987, abandoned.

[30] Foreign Application Priority Data

Sep. 2, 1986 [DE] Fed. Rep. of Germany ....... 3629765

[51] Int. Cl.⁵ ............................................. C01B 17/88
[52] U.S. Cl. .................................................. 423/522
[58] Field of Search ................ 423/522, DIG. 1

[56] References Cited

U.S. PATENT DOCUMENTS 4,670,235 6/1957 Lailach et al. ............... 423/522

FOREIGN PATENT DOCUMENTS

| 705824 | 3/1965 | Canada ......................... 423/522 |
| 0177806 | 4/1986 | European Pat. Off. . |
| 2137847 | 2/1972 | Fed. Rep. of Germany . |
| 2122634 | 11/1972 | Fed. Rep. of Germany ...... 423/522 |
| 2238669 | 2/1975 | France . |
| 744465 | 2/1966 | United Kingdom . |

*Primary Examiner*—Jeffrey E. Russel
*Attorney, Agent, or Firm*—Sprung Horn Kramer & Woods

[57] ABSTRACT

A process for the purification of hot exhaust gases containing dust, sulphur dioxide and/or hydrogen chloride and/or hydrogen fluoride and having a water vapor partial pressure of at least 15 volume %, wherein a) the hot exhaust gases are cooled to temperatures below 135° C. by scrubbing with 60–75% sulphuric acid, b) the exhaust gases from a) are cooled to 60°–80° C. by contact with 5–20% sulphuric acid, c) the exhaust gases from b) are desulphurized in contact with moist active charcoal to form sulphuric acid, d) the sulphuric acid formed in c) is raised to a concentration of 5 to 20% $H_2SO_4$ in contact with the hot exhaust gases, e) the 5 to 20% sulphuric acid formed in d) is evaporated to a concentration of 60 to 80% $H_2SO_4$ by the heat obtained from cooling the exhaust gases of a) and f) prior to stage e) HCl and/or HF is removed from a mixture of 5 to 20% $H_2SO_4$ from d) with 60 to 80% sulphuric acid.

7 Claims, 2 Drawing Sheets

PROCESS FOR THE PURIFICATION OF EXHAUST GASES

This is a continuation of application Ser. No. 089,898, filed Aug. 27, 1987 now abandoned.

Process for the purification of hot exhaust gases containing dust, sulphur dioxide and/or hydrogen chloride and/or hydrogen fluoride.

Exhaust gases such as those obtained, for example, from calcining processes or the burning of sludge frequently contain a relatively large amount of dust, $SO_2$, HCl, HF and mercury. When these exhaust gases are washed with water or alkaline washing solutions, these substances are in many cases simply transferred from the exhaust gases to the effluent or carried away to waste dumps. The object of treating exhaust gas should, however, be to convert the substances in it into re-useable products.

A process for the purification of flue gases which may also contain these impurities has been proposed in EP-A 177 806. In the process described there, the $SO_2$ is converted into 3 to 20% sulphuric acid by catalytic oxidation in the presence of moist active charcoal and this sulphuric acid is evaporated in two stages to a concentration of 60 to 85% $H_2SO_4$ in countercurrent to the flue gas, and the HCl and HF are removed at the same time. This process, however, is no longer applicable when the partial pressure of the water vapor in the exhaust gases rises higher than about 15 volumes % because the concentration of at least 60%, which is necessary for economical utilization of the sulphuric acid obtained, can no longer be achieved simply by utilizing the heat from the exhaust gases.

It is an object of the present invention to provide a process by which even exhaust gases having a partial pressure of water vapor higher than 15 volume % can be purified.

The present invention relates to a process for the purification of hot exhaust gases containing dust, sulphur dioxide and/or hydrogen chloride and/or hydrogen fluoride and having a water vapor partial pressure of at least 15 volume %, characterized in that
a) the exhaust gases are cooled to temperatures below 135° C. by scrubbing with 60-75% sulphuric acid,
b) the exhaust gases are cooled to 60°-80° C. by contact with 5-20% sulphuric acid,
c) the exhaust gases are desulphurized in contact with moist active charcoal to form sulphuric acid,
d) the sulphuric acid formed in c) is raised to a concentration of 5 to 20% $H_2SO_4$ in contact with the hot exhaust gases,
e) the 5 to 20% sulphuric acid formed in d) is evaporated to a concentration of 60 to 80% $H_2SO_4$ by the heat obtained from cooling the exhaust gases of a) and
f) prior to stage e) HCl and/or HF is removed from a mixture of 5 to 20% $H_2SO_4$ from d) with 60 to 80% sulphuric acid.

The process according to the invention is particularly suitable for the purification of hot exhaust gases which are at a temperature of 170° to 500° C.

It is particularly advantageous to remove as far as possible the droplets of sulphuric acid containing solid particles from the exhaust gases cooled in stage a). This may be carried out in known mist eliminators. According to the invention, the flue gases now freed from solid particles are cooled as described in stage b) in a first concentrator and at the same time washed substantially free of HCl and HF. In stage c), the now partly purified exhaust gases are passed through a layer of moist active charcoal in which the $SO_2$ is converted into sulphuric acid. The charcoal is then sprayed with water so that the sulphuric acid together with any remaining HCl and HF is washed out of the charcoal as an acid solution having a concentration of at the most 15%.

The sulphuric acid discharged from the layer of active charcoal is then advantageously evaporated in the first concentrator as defined in stage d) to be concentrated to a sulphuric acid content of 5 to 20%. The sulphuric acid still containing HCl and HF is removed from the concentrator and mixed with sufficient 60-80% sulphuric acid from concentrator II to produce a mixture containing 50-70% $H_2SO_4$ from which HCl and HF may be removed by stripping.

The sulphuric acid discharged from the stripper may then advantageously be concentrated by evaporation in a further concentrator to a sulphuric acid concentration of 60 to 80%.

Cooling of the exhaust gases at the scrubbing stage is preferably carried out by transferring the heat from the gases to the 60-75% sulphuric acid in the scrubber a) and then transferring this heat from the 60-75% sulphuric acid to 60-80% sulphuric acid in heat exchangers, the said 60-80% sulphuric acid having been obtained by evaporative concentration in e).

In stage a) of the process, the exhaust gases are preferably cooled to temperatures in the region of 100° to 130° C. The solid substances separated in the process of scrubbing the exhaust gases may be removed from a partial stream of the circulating sulphuric acid. HCl and HF from the gases leaving the stripper may be washed out with a cooled mixture of hydrochloric and hydrofluoric acid in an absorber.

The state of the art provides various possibilities for carrying out the individual stages of the process. The apparatus used for scrubbing the gases containing dust are preferably venturi scrubbers, jet scrubbers or scrubbing towers with nozzle grates because these do not give rise to any problems due to the deposition of solid substances. Laminar separators are preferred for efficient separation of the acid droplets containing solid particles.

The above mentioned gas scrubbers or packed towers may be used for the first concentrator. The catalytic removal of $SO_2$ is carried out in accordance with the state of the art (EP-A-177 806). Evaporation of the sulphuric acid to a concentration of 60 to 80% is preferably carried out in forced circulation vacuum evaporators. These are preferably single stage evaporators and are operated at 80°-120° C. and 30 to 100 mbar and vapor condensation may be carried out by direct or indirect cooling.

In another preferred embodiment of the process according to the invention, concentration of the sulphuric acid by evaporation is carried out in evaporation coolers. In these apparatus, the water to be evaporated is preferably driven off by contact of the circulating hot acid with air. The concentrating apparatus used may again be venturi or jet scrubbers or scrubbing towers. The relatively large quantity of air which is heated to 80° to 120° C. in these apparatus may be returned as pre-heated air of combustion to the combustion apparatus in which the exhaust gas is produced.

A preferred embodiment of the process according to the invention therefore consists in that the air heated in the evaporation cooler is used for the process of combustion in which the exhaust gases are produced.

The following substances are thus obtained as by-products from the purification of exhaust gases by the process according to the invention:

Dust which may be dumped in a moist form or returned to the process of combustion; 60 to 80% sulphuric acid which may be used for many different purposes by virtue of its purity; an approximately 20% mixture of hydrochloric acid and hydrofluoric acid which may have applications, for example, in mordanting solutions for stainless steel.

If the mercury content in the exhaust gases is relatively high, it may be necessary to remove it from the sulphuric acid. Known processes are available for this.

BRIEF DESCRIPTION OF THE DRAWINGS

The process according to the invention will now be described in more detail with reference to FIGS. 1 and 2.

Figure 1:
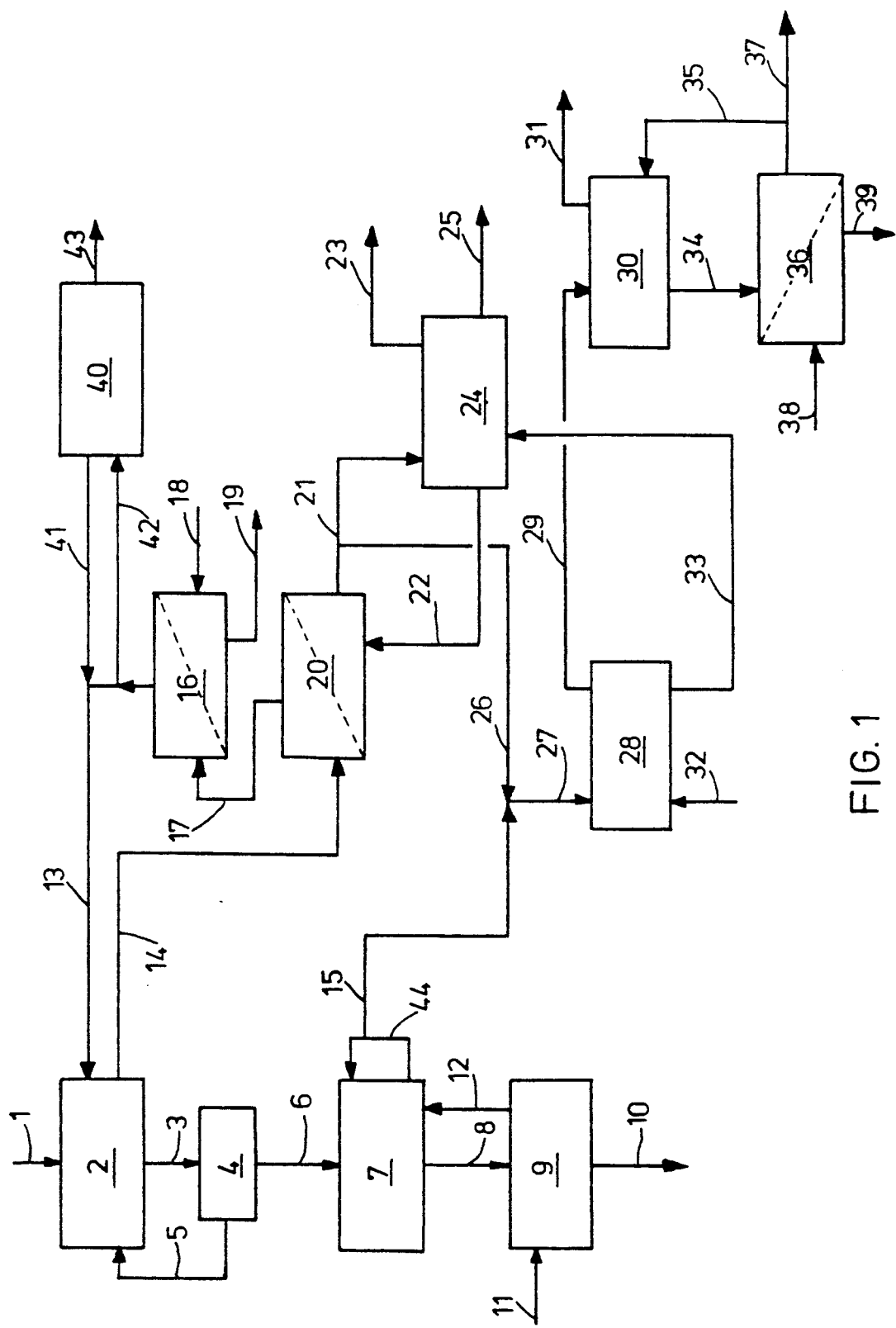
In FIG. 1, the hot exhaust gases (1) which are at a temperature of 170° to 500° C. and contain more than 15 Vol % $H_2O$ are scrubbed free from dust in a scrubber (2) by means of 60 to 75% sulphuric acid which contains solid substances and dissolved sulphates. The sulphuric acid (14) leaves the scrubber (2) at a temperature of 100° to 140° C. and is cooled with 60 to 80% sulphuric acid (22) as cooling medium in one or more heat exchangers (20).

The cooled sulphuric acid (17) is then transferred to one or more heat exchanger (16) in which sufficient thermal energy is removed from the sulphuric acid by means of cooling water (18, 19) to enable the cooled circulating acid (13) to cool the exhaust gases in the scrubber (2) to temperature in the region of 100° to 130° C. The stream of exhaust gas (3) which has been cooled and scrubbed free from dust is transferred to a mist eliminator (4) in which acid droplets are removed from the exhaust gas. The acid (5) removed with the droplets flows back into the scrubber (2).

The exhaust gases (6) which have been cooled and scrubbed free from dust are brought into contact with 5 to 20% sulphuric acid (44) in the concentrator I (7) in which the exhaust gases are cooled to 60°-80° C. due to the evaporation of water from the sulphuric acid. At the same time, HCl and HF present in the exhaust gases for the most part dissolve in the sulphuric acid. The now partly purified exhaust gases (8) are introduced into a fixed bed reactor (9) in which they are passed through a layer of moist active charcoal in which the $SO_2$ is converted into sulphuric acid. The purified exhaust gases (10) are discharged into the atmosphere or transferred to an apparatus to be re-heated. The sulphuric acid formed in the layer of active charcoal is washed out of the charcoal as a sulphuric acid having a concentration of at the most 15% and containing small quantities of HCl and HF by spraying the layer of charcoal with water (11), and this sulphuric acid is introduced (12) into the concentrator I (7) in which it is concentrated to an $H_2SO_4$ content of 5 to 20%. 5 to 20% sulphuric acid (15) containing HCl and HF is discharged from the concentrator I (7) at a rate and concentration depending on the sulphuric acid fed into it at (12). The sulphuric acid (15) is mixed with the required quantity of 60 to 80% sulphuric acid (26) from the circulating system of the concentrator II (24) to produce a mixture containing 50 to 70% $H_2SO_4$ (27). This mixture is fed into a stripper (28) in which HCl and HF are blown out of the acid with gas (32). The gas (32) may be air but is preferably a partial stream of the partly purified exhaust gases.

The sulphuric acid (33) free from HCl and HF flows out of the stripper (28) into the concentrator II (24). The concentrator II (24) is a forced circulation vacuum evaporator. The sulphuric acid which is kept in circulation is heated from 80°-120° C. (22) to 90°-125° C. (21) in the heat exchanger (20) in which the circulating acid (14) from the scrubber (2) is used as heating medium. The sulphuric acid is then concentrated to 60-80% $H_2SO_4$ in the vacuum evaporator (24) at 30-100 mbar. All the sulphuric acid formed in the process of desulphurization is discharged from the system as pure acid (25) at this concentration. The vapors (23) resulting from evaporation are condensed in the usual manner in injection condensers or in indirectly cooled condensers.

The gases (29) containing HCl and HF are transferred from the stripper (28) into an absorber (30) in which most of the HCl and HF are removed from the gases by scrubbing with a cold mixture of hydrochloric acid and hydrofluoric acid (35) before the gases (31) are introduced into the stream of exhaust gases, preferably before the concentrator I (7).

The acid (34) discharged from the absorber (30) is cooled with cooling water (38, 39) in the heat exchanger (36). An acid containing approximately 20% HCl is removed as by-product (37). The HF content of this acid depends on the composition of the exhaust gas (1).

A partial stream (42) is removed continuously or intermittently from the acid circulating through the scrubber (2) and the solid substances (43) which have been separated from the exhaust gases in the scrubber (2) are removed from this partial stream (42) in a suitable apparatus, e.g. a filter (40). The acid, now free from these solid impurities, is returned to the scrubber (2).

Figure 2:
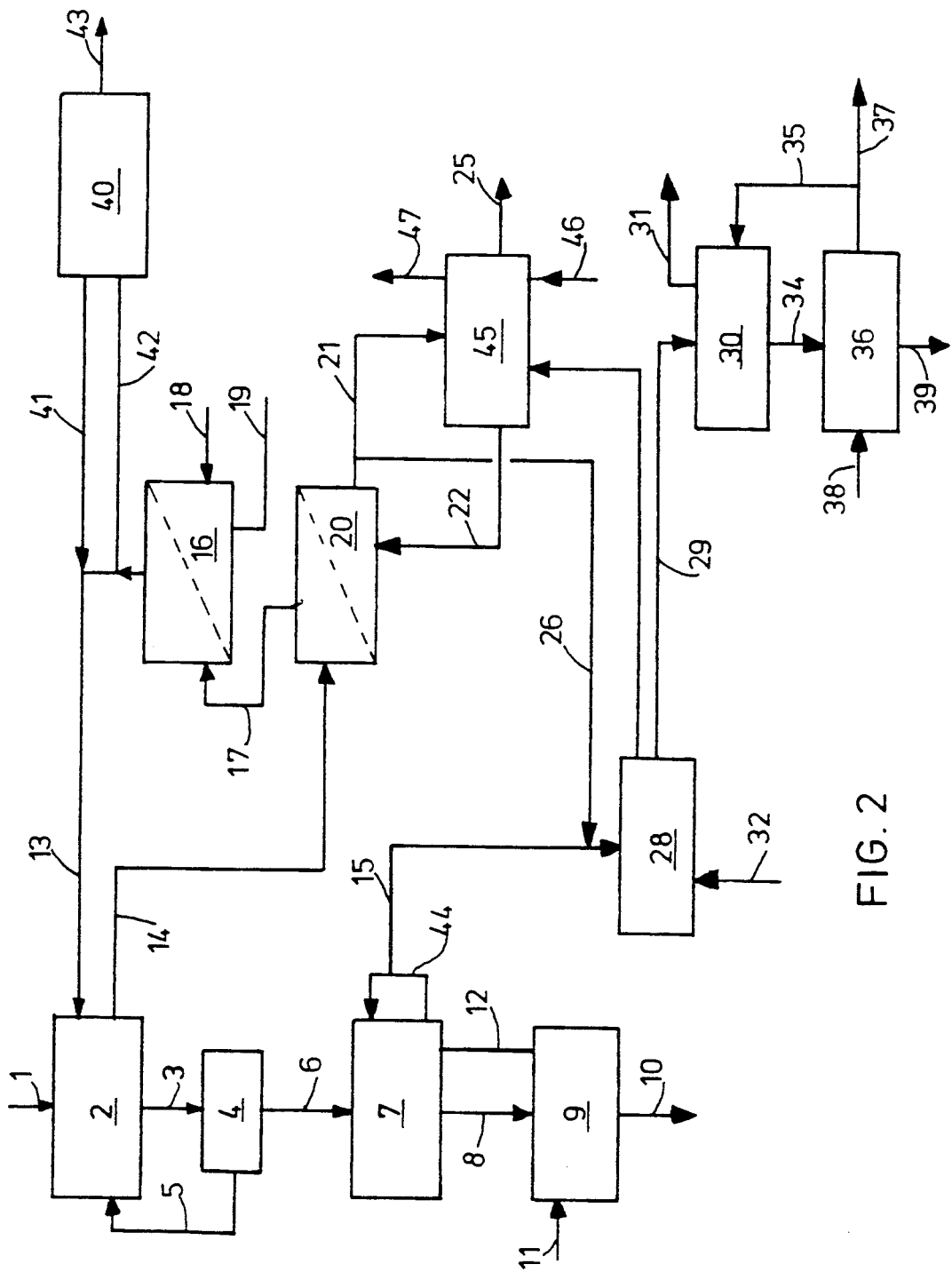

The variation of the process illustrated in FIG. 2 differs from that of FIG. 1 in the method by which the sulphuric acid is concentrated to an $H_2SO_4$ content of 60 to 80%. An evaporation cooler (45) is used instead of the forced circulation vacuum evaporator (24). The evaporation coolers may consist of cooling towers, packed towers, venturi scrubbers, jet scrubbers or other apparatus in which water is evaporated from the heated sulphuric acid (21) by contact with air (46). The exhaust air (47) which has been heated to temperature in the region of 90°-120° C. may then advantageously be used as pre-heated air of combustion.

These advantages of the process according to the invention will now be illustrated by practical examples which should not, however, be regarded as limiting the invention.

EXAMPLE 1

100,000 $m^3/h$ of exhaust gas is obtained at a temperature of 250° C. from burning sludge. The exhaust gas has the following composition:

25.5 Vol % $H_2O$; 7.4 Vol % $O_2$; 7.7 Vol % $CO_2$; 59.2 Vol % $N_2$, 2200 mg $SO_2/m^3$, 150 mg $HCl/m^3$, 125 mg $HF/m^3$, 600 mg dust/$m^3$.

(All volumes indicated are based on moist gas under standard conditions).

The exhaust gas is purified in a plant illustrated in FIG. 1. The exhaust gas (1) is cooled and scrubbed with 245 t/h of 70% sulphuric acid (13) in a venturi scrubber (2). The sulphuric acid has a solids content of about 1% by weight and is at a temperature of 90° C. The exhaust gas (3) leaving the scrubber (2) has a moisture content of 25.5 volume % and is at a temperature of 125° C., is free from dust and contains droplets of 70% sulphuric acid which contains solid particles. The droplets are separated by passing the exhaust gas through a laminar separater (4). The impure sulphuric acid (5) which has been separated is returned to the scrubber (2).

The sulphuric acid which contains solid particles is removed (14) from the scrubber (2) at a temperature of 125° C. and cooled in a series of heat exchangers (20, 16), first to 112° C. (17) with pure 70% sulphuric acid (22) and then to 90° C. with cooling water (18, 19). In the heat exchanger (16) a maximum of 180 m³/h of cooling water is heated from 25° C. (18) to 40° C. (19). 6.2 t/h of the cooled sulphuric acid (42) containing solid particles are filtered (40) and returned as acid free from solids (41) to the acid circulation. The filter cake (43) containing 60 kg/h of dry substance is removed from the filter (40) and is advantageously returned to the apparatus for burning sludge. The cooled exhaust gas (6) free from solids is brought into contact with 10.45% sulphuric acid (44) in a concentrator I (7). The exhaust gas is thereby cooled from 125° C. (6) to 69° C. (8) and its steam content is at the same time increased to 28.5 volumes % due to the evaporation of water from the sulphuric acid. In addition, HCl and HF are for the most part washed out of the exhaust gas and dissolved in the sulphuric acid.

The partly purified exhaust gas (8) is passed through a fixed bed reactor (9) containing active charcoal. The $SO_2$ brought into contact with the moist active charcoal is converted into sulphuric acid. HCl and HF are dissolved in the dilute sulphuric acid. The purified exhaust gas (10) is saturated with water vapour at 69° C. and contains 61 mg $SO_2/m^3$, 4 mg $HCl/m^3$ and 5 mg $HF/m^3$.

The acid formed in the reactor (9) is washed out as dilute sulphuric acid (12) (6.52 t/h) as a result of the active charcoal being sprayed with 6.3 t/h $H_2O$. This sulphuric acid, which still contains small quantities of HCl and HF in addition to 5% by weight of $H_2SO_4$, is fed into the concentrator I (7) in which it is concentrated to an $H_2SO_4$ content of 10.45%. Acid containing 10.45% $H_2SO_4$, 0.48% HCl and 0.40% HF (15) is removed from the circulation in the concentrator I (7) at the rate of 3.12 t/h. This acid mixture is mixed with 6 t/h of 70% sulphuric acid (26) which is at a temperature of 110° C. The resulting acid mixture (27) is introduced into the stripper (28) in which 300 m³/h of purified exhaust gas (10) is used as stripper gas. The gas (29) which is charged with HCl and HF in the stripper (28) is scrubbed with acid (33) at 40° C. in the scrubbing tower (30) and water condenses at the rate of 80 kg/h. The solution absorbs 14.6 kg/h of HCl and 12.0 kg/h of HF. The acid (34) leaving the scrubbing tower (30) at a temperature of 50° C. is cooled to 40° C. with cooling water (38, 39) in the heat exchanger (36). 106.6 kg/h of acid containing 13.7% HCl and 11.3% HF are removed from the circulation (37).

The sulphuric acid (33) which has been freed from HCl and HF in the stripper (28) is fed into a forced circulation vacuum evaporator (24). In this concentrating system II 700 m³/h of 76% sulphuric acid are circulated through the heat exchanger (20), in which it is heated from 107° to 110° C., and the evaporator (24), in which 2.7 t/h of water are evaporated at 50 mbar and the acid is cooled from 110° to 107° C. The vapors and leakage air (23) are drawn off into the condenser. 0.429 t/h of pure 76% sulphuric acid (25) are discharged from the evaporator.

EXAMPLE 2

This example is similar to example 1 but the concentrator II is in this case an evaporation cooler (corresponding to FIG. 2).

In this case the sulphuric acid from the scrubbing cycle (14), which still contains solids, is cooled from 125° to 97° C. in the heat exchanger (20) by means of the pure 70% sulphuric acid from the concentrator II (22) used as cooling medium. Further cooling of the acid (17) to 90° C. in the second heat exchanger (16) in this case requires only 54 m³/h of cooling water if the latter is heated from 25° C. (18) to 40° C. (19).

Pure 70% sulphuric acid (21) which has been heated to 110° C. in the heat exchanger (20) is transferred to the cooling tower (45) in which 2.65 t/h of water is evaporated from this acid by 74,000 m³/h (under standard conditions) of air (46) blown through the sulphuric acid flowing down the tower. The air, which is heated from 25° C. to 100° C. in the process, may be used as preheated air of combustion for the burning of sludge, thereby providing a saving of energy of 8 GJ/h.

What is claimed is:

1. A process for the purification of hot exhaust gases containing dust, sulphur dioxide and/or hydrogen chloride and/or hydrogen fluoride and having a partial pressure of water vapor of at least 15 volume %, comprising
   a) cooling the hot exhaust gases to a temperature below about 135° C. and at the same time scrubbing said exhaust gases with 60 to 75% sulphuric acid,
   b) further cooling the exhaust gases from a) to about 60°-80° C. by contacting said gases with 5 to 20% sulphuric acid,
   c) desulphurizing the exhaust gases from b) by contacting with moist active charcoal with the formation of sulphuric acid,
   d) acid from c) is recycled to b)
   e) a portion of acid from b) is mixed with 60-80% acid formed in concentrator of h)
   f) HCl and/or HF are stripped from the mixture formed in e)
   g) passing residual acid stream from f) to a concentrator and heating acid in the concentrator by indirect heat exchange with acid resulting from a)
   h) concentrating acid to 60-80% and recovering a portion thereof and returning the remaining portion to e).

2. A process according to claim 1, wherein the hot exhaust gases are at a temperature of about 170° to 500° C.

3. A process according to claim 1, wherein cooling of the exhaust gases in a) is carried out to a temperature of about 100° to 130° C.

4. A process according to claim 1, wherein the concentration of sulphuric acid by evaporation in g) is carried out in forced circulation vacuum evaporators.

5. A process according to claim 1, wherein the concentration of sulphuric acid by evaporation in g) is carried out in evaporation coolers.

6. A process according to claim 5, wherein air is used to drive off the steam.

7. A process according to claim 6, wherein the air heated in the evaporation cooler is used for the combustion in which the exhaust gases are produced.

* * * * *